Patented Apr. 8, 1952

2,592,113

UNITED STATES PATENT OFFICE 2,592,113

PROCESS FOR THE MANUFACTURE OF ALKALI ALUMINUM FLUORIDE

Erling Brodal and Henning Guldhav, Hoyanger, Norway, assignors to Aktieselskapet Norsk Aluminium Company, Oslo, Norway No Drawing. Application November 15, 1945, Serial No. 628,976. In Norway May 6, 1941

Section 1, Public Law 690, August 8, 1946
Patent expires May 6, 1961

1 Claim. (Cl. 23—88)

The present invention has for its object a process for the manufacture of alkali metal aluminum fluorides from fluorspar without the use of sulphuric acid or acid sulphates to bring about the decomposition of the fluorspar.

According to the invention, the fluorspar is heated with an alkaline reaction agent in the presence of an alkali aluminum silicate to a temperature sufficient to bring about sintering of the charge, so as to obtain a solid reaction product which is thereupon lixiviated in aqueous liquid containing alkali metal hydroxide. Hereby an alkaline solution of alkali metal aluminum fluoride is obtained, from which the said double fluoride is thereupon precipitated in the solid condition.

The silica constituent of the charge being heated is present in an amount sufficient to combine with a substantial proportion of the calcium present in the charge. The silica constituent may taken the form of alkali metal aluminum silicates, such as labradorite, nepheline, albite or the like or may be present in the free state, such as in the form of quartz.

The alkaline reaction agent of the charge may be added to the charge as an alkali metal carbonate, or as caustic alkali.

When a sodium aluminium silicate is used as the only silica constituent of the fluorspar charge to be treated, the process according to the invention may be carried out as follows:

53 kg. albite, 47 kg. fluorspar, 60 kg. limestone and 22 kg. of soda are ground to −200 mesh and heated to sintering at about 750° C. for 2 hours.

The sinter is crushed to −200 mesh and lixiviated for one hour at about 70° C. in 1000 litres of a 0.5 per cent NaOH-solution. After filtering $CO_2$-gas is introduced to precipitate $Na_3AlF_6$. This product is filtered off and further treated. By calcination a product is obtained which can be directly used as a bath for the manufacture of aluminum by electrolysis.

In the execution of this process the albite can be replaced by any other alkali aluminum silicate occurring in nature or of mixtures of substances of corresponding composition. Nepheline and labradorite are examples of suitable raw materials. As a constituent of the charge may also enter free silica, for example quartz, together with necessary additional constituents. Soda can be employed as the single alkali, but it can be used with advantage together with other alkali or with limestone. This latter can be replaced by other alkaline earth carbonate, for example magnesium carbonate or corresponding oxides or mixtures.

An important advantage of the present process as compared with other known processes for the manufacture of artificial kryolite consists therein that the fluorspar (or other fluoride mineral) employed as an initial material can be used in a crude (undressed) condition. A fluorspar product containing for example 60% or less of $CaF_2$ can be directly employed as a constituent of the charge.

We claim:

A process for the manufacture of sodium aluminum fluoride comprising heating alumina in the form of alkali aluminum silicate with fluorspar and an alkali selected from the group consisting of alkali metal oxide and alkali metal carbonate, in the presence of silica in an amount sufficient to combine with a substantial proportion of the calcium present, to a temperature to bring about sintering of the charge, lixiviating the solid reaction product obtained with an aqueous sodium hydroxide solution to obtain an alkaline solution of sodium aluminum fluoride containing some free sodium hydroxide, immediately thereafter separating undissolved solids from the solution and precipitating solid sodium aluminum fluoride from the solution by adding a neutralizing agent.

ERLING BRODAL.
HENNING GULDHAV.

REFERENCES CITED

The following references are of record in the file of this patent:

UNITED STATES PATENTS

| Number | Name | Date |
|---|---|---|
| 400,766 | Hall | Apr. 2, 1889 |
| 447,063 | Richter | Feb. 24, 1891 |
| 1,091,795 | Bidtel | Mar. 31, 1914 |
| 1,871,723 | Morrow | Aug. 16, 1932 |
| 1,891,608 | Scheidt | Dec. 20, 1932 |
| 2,182,509 | Heiser | Dec. 5, 1939 |
| 2,196,077 | Morrow et al. | Apr. 2, 1940 |
| 2,210,594 | Morrow | Aug. 6, 1940 |
| 2,328,846 | Pitzer | Sept. 7, 1943 |
| 2,365,702 | Hignett | Dec. 26, 1944 |

FOREIGN PATENTS

| Number | Country | Date |
|---|---|---|
| 45,913 | Russia | Feb. 29, 1936 |

OTHER REFERENCES

Gatullin—Legkie Metal 1, No. 12, 24–8 (1932); Chem. Zentr. 1934, I, 928 (cited in Chemical Abstracts, vol. 29, column 5227).